(12) United States Patent
Milbredt

(10) Patent No.: US 8,918,570 B2
(45) Date of Patent: Dec. 23, 2014

(54) STAR COUPLER FOR A BUS SYSTEM, BUS SYSTEM HAVING SUCH A STAR COUPLER AND METHOD FOR INTERCHANGING SIGNALS IN A BUS SYSTEM

(75) Inventor: Paul Milbredt, Wettstetten (DE)

(73) Assignees: Audi AG, Ingolstadt (DE); Audi Electronics Venture GmbH, Galmershelm (DE)

( * ) Notice: Subject to any disclaimer, the term of this patent is extended or adjusted under 35 U.S.C. 154(b) by 238 days.

(21) Appl. No.: 13/380,296

(22) PCT Filed: May 8, 2010

(86) PCT No.: PCT/EP2010/002819
§ 371 (c)(1),
(2), (4) Date: Dec. 22, 2011

(87) PCT Pub. No.: WO2010/149248
PCT Pub. Date: Dec. 29, 2010

(65) Prior Publication Data
US 2012/0096210 A1 Apr. 19, 2012

(30) Foreign Application Priority Data
Jun. 24, 2009 (DE) .......................... 10 2009 030 204

(51) Int. Cl.
| | |
|---|---|
| G06F 13/36 | (2006.01) |
| H04L 12/417 | (2006.01) |
| H04L 12/44 | (2006.01) |
| H04J 3/06 | (2006.01) |
| H04L 12/40 | (2006.01) |

(52) U.S. Cl.
CPC .............. *H04L 12/44* (2013.01); *H04L 12/417* (2013.01); *H04L 2012/40241* (2013.01); *H04J 3/0685* (2013.01)
USPC .......................................... 710/117; 710/317

(58) Field of Classification Search
CPC ....................................................... H04L 12/44
USPC .......................................................... 710/117
See application file for complete search history.

(56) References Cited

U.S. PATENT DOCUMENTS

| | | | |
|---|---|---|---|
| 4,495,574 A * | 1/1985 | Hofstetter ...................... | 710/316 |
| 5,088,091 A * | 2/1992 | Schroeder et al. ............. | 370/406 |

(Continued)

FOREIGN PATENT DOCUMENTS

| | | |
|---|---|---|
| CN | 101221438 | 7/2008 |
| DE | 102009030204.2 | 6/2009 |

(Continued)

OTHER PUBLICATIONS

International Search Report for PCT/EP2010/002819, mailed on Aug. 6, 2010.

(Continued)

*Primary Examiner* — Paul R Myers
(74) *Attorney, Agent, or Firm* — Staas & Halsey LLP

(57) ABSTRACT

A star coupler has the ability to distinguish signals arriving via connections according to the time slot in which they arrive and to forward these signals to at least one other connection on the basis of the connection via which the signals arrive and on the basis of the time slot. An assignment in which the star coupler once treats the bus system as a single bus system and virtually divides the bus system into two subsystems in another time slot is possible in particular.

19 Claims, 1 Drawing Sheet

(56) References Cited

U.S. PATENT DOCUMENTS

| | | | | |
|---|---|---|---|---|
| 5,357,518 | A * | 10/1994 | Peter | 714/4.5 |
| 5,377,182 | A * | 12/1994 | Monacos | 370/219 |
| 5,654,695 | A * | 8/1997 | Olnowich et al. | 340/2.23 |
| 6,230,229 | B1 * | 5/2001 | Van Krevelen et al. | 710/317 |
| 6,614,796 | B1 * | 9/2003 | Black et al. | 370/403 |
| 6,996,115 | B1 * | 2/2006 | Budde et al. | 370/407 |
| 7,103,805 | B2 * | 9/2006 | Belschner et al. | 714/43 |
| 7,124,316 | B2 * | 10/2006 | Kopetz et al. | 714/2 |
| 7,213,097 | B2 * | 5/2007 | Kasame et al. | 710/317 |
| 7,519,055 | B1 * | 4/2009 | Zheng et al. | 370/389 |
| 7,584,319 | B1 * | 9/2009 | Liao et al. | 710/317 |
| 7,630,390 | B2 * | 12/2009 | Zumsteg et al. | 370/425 |
| 7,843,905 | B2 * | 11/2010 | Beshai | 370/376 |
| 7,852,836 | B2 * | 12/2010 | Scott et al. | 370/388 |
| 7,873,739 | B2 * | 1/2011 | Hall et al. | 709/230 |
| 8,004,993 | B2 * | 8/2011 | Angelow | 370/240 |
| 8,204,037 | B2 * | 6/2012 | Poledna et al. | 370/350 |
| 8,265,100 | B2 * | 9/2012 | Steiner et al. | 370/503 |
| 8,432,814 | B2 * | 4/2013 | Fuhrmann et al. | 370/242 |
| 2003/0067873 | A1 * | 4/2003 | Fuhrmann et al. | 370/230 |
| 2007/0010205 | A1 * | 1/2007 | Wielage | 455/63.3 |
| 2008/0098234 | A1 * | 4/2008 | Driscoll et al. | 713/189 |
| 2009/0279540 | A1 * | 11/2009 | Van Wageningen | 370/375 |
| 2010/0061404 | A1 * | 3/2010 | Newald | 370/503 |

FOREIGN PATENT DOCUMENTS

| | | | |
|---|---|---|---|
| DE | 10 2008 014 254 A1 | 9/2009 | |
| EP | 942624 A1 * | 9/1999 | H04Q 11/06 |
| EP | 2 148 474 A1 | 1/2010 | |
| WO | 2008/029320 A2 | 3/2008 | |
| WO | PCT/EP2010/002819 | 5/2010 | |

OTHER PUBLICATIONS

German Office Action for Priority Application No. DE 10 2009 030 204.2, issued on Mar. 3, 2010.
Chinese Office Action issued Jun. 4, 2014 in Chinese Patent Application No. 201080028183.8.

* cited by examiner

STAR COUPLER FOR A BUS SYSTEM, BUS SYSTEM HAVING SUCH A STAR COUPLER AND METHOD FOR INTERCHANGING SIGNALS IN A BUS SYSTEM

CROSS REFERENCE TO RELATED APPLICATIONS

This application is based on and hereby claims priority to International Application No. PCT/EP2010/002819 filed on May 8, 2010 and German Application No. 102009030204.2-31 filed on Jun. 24, 2009, the contents of which are hereby incorporated by reference.

BACKGROUND

The invention relates to a star coupler for a bus system and to a bus system in which such a star coupler is used. It also relates to a method for interchanging signals in a bus system, in which a plurality of bus branches are coupled via a star coupler.

A star coupler is the central element of a star connection. A plurality of bus branches are connected to such a star coupler. Each bus branch comprises at least one control device, in which case at least some of the control devices can transmit and some of the control devices can receive, and preferably at least some of the control devices can both transmit and receive. The task of a star coupler is to forward the signals arriving from one branch to the other branches. In this case, an active star coupler amplifies the signals. For example, DE 10 2005 061 395 A1 discloses an active star point for use in a communication system with star topology, which star point amplifies incoming analog signals with the aid of an operational amplifier and forwards said signals. Said document mentions the fact that an incoming data signal can be distributed to one or more of the remaining branches. However, on account of the purely analog method of operation of the active star point from DE 10 2005 061 395 A1, said star point is not suitable for use in time-controlled systems.

In time-controlled bus systems, for instance in FlexRay systems or TTP/C systems used in motor vehicles, a cycle time is divided into a plurality of time slots. Only a particular control device is allowed to transmit in each time slot so that there is no signal interference with the signals from another control device. Such time-controlled systems contain so-called bus guardians which check whether a user (control device) of the bus system is even allowed to transmit at the respective time, that is to say in a current time slot. The bus guardian also determines whether the message is allowed to be distributed. Such a bus guardian can be integrated in a star coupler. In time-controlled systems, such a star coupler usually includes cascaded transceivers for each branch. From the point of view of the star coupler, such a transceiver is respectively assigned to a plurality of connections to which bus branches can be connected. Transceivers convert analog signals arriving via the respective associated connection into digital signals and convert signals running to the respective associated connection from digital signals into analog signals. The bus guardian function can be used in the phase in which the signals have been converted into digital signals and have not yet been converted back into analog signals. The star coupler then typically comprises a timer in order to be able to distinguish individual time slots from one another. With an increasing number of bus users, buses reach their limit in terms of their transmission capacity. For example, a FlexRay bus has a bus bandwidth of 10 Mbits. It is desirable to use this bandwidth as optimally as possible. For this purpose, there has been a move toward dividing the bus system into individual clusters, the bus users in a cluster being allowed to transmit in time slots defined for the cluster. Data can be interchanged between different clusters only if a so-called gateway is used. In time-controlled systems, at least two synchronization nodes must be present in each cluster system. A separate bus guardian must be used in each cluster in order to safeguard communication.

SUMMARY

One potential object is to improve the data transmission efficiency in time-controlled bus systems.

The inventor proposes a star coupler for a bus system, having a plurality of connections to which bus branches can be connected, the connections being coupled to a digital data processing unit via a respective transceiver, the transceivers converting analog signals arriving via the respective associated connection into digital signals which run on to the data processing unit and converting digital signals emitted by the data processing unit into analog signals which run on to the respective associated connection, the data processing unit comprising a timer, with the result that, for each connection, the time can be divided into a cyclically repeating sequence of time slots, and the data processing unit being designed to forward a signal received from a connection in a predetermined time slot defined for the connection to at least one further connection stipulated according to a predetermined assignment in a time slot stipulated by the predetermined assignment and defined for the further connection.

As a result of the fact that signals are not automatically forwarded in the proposed star coupler but rather in a defined manner on the basis of the predetermined assignment, the bus system can be optimally designed for the respective purposes by suitably configuring this predetermined assignment. The assignment may, in particular, be such that, unlike previously, all signals received from a first connection are not forwarded to all other connections in each time slot. It is thus possible, in at least one time slot, for the star coupler to virtually divide the bus system (the network) into a plurality of subsystems (subnetworks) in which the coupler forwards messages only within the subsystems. It is possible, in particular, for the star coupler to receive signals via two connections in the same time slot with a temporal overlap, for example when the time slot sequence is globally defined, the star coupler forwarding the signal from the first connection to a first further connection and forwarding the signal from the second connection to a second further connection. The bus branch connected to the first connection then forms a subnetwork with the bus branch connected to the first further connection for the duration of the time slot, and the bus branch connected to the second connection then likewise forms a subnetwork with the bus branch connected to the second further connection. By observing the time slots, the star coupler simultaneously has the function of a bus guardian. Even if a plurality of subnetworks are virtually formed, a single star coupler suffices as part of both subnetworks and said star coupler simultaneously has the function of the bus guardian for all subnetworks. The bandwidth offered by the FlexRay bus system can thus be optimally used. Separate clock synchronization is not respectively required in individual subsystems since, because it is possible to provide for a signal to be forwarded to all bus branches in one or more time slots on the basis of the assignment, clock synchronization can be effected via this signal. There is therefore no need for any changes whatsoever to the protocol. It is possible to dispense with a gateway. The solution is thus particularly inexpensive.

In one embodiment, the assignment is dependent, in particular, on the time slot and is different for different time slots even if the signal arrives via the same connection. In other words, the assignment for signals arriving via at least one connection may be different for two different time slots defined for the connection. A bus user in the bus branch connected to precisely this connection can thus sometimes emit signals for a subnetwork and can sometimes emit signals for the entire network. This can be expressed in such a manner that, for at least one of the connections, a signal arriving in a first time slot defined for this connection is forwarded to a first further connection and a signal arriving in a second time slot defined for this connection is not forwarded to the first further connection. The first further connection can simply be dispensed with. The latter signal can instead be forwarded, for example, to a second further connection to which the first signal is not forwarded.

In one preferred embodiment, the time slots are globally defined, that is to say the same sequence of time slots is defined for each connection. This facilitates handling and assignment.

It is possible to receive signals via at least two different connections in at least one time slot and to forward the signal arriving from a first connection to at least one first further connection and to forward the signal arriving from the second connection in the same time slot to at least one second further connection. This is precisely the situation in which the bus system is divided into two subsystems, at least for the duration of the relevant time slot.

The data processing unit preferably operates so quickly that the signals can be forwarded in the same time slot as they were received. It is possible to deliberately forward the signals in a time slot (in particular a later time slot) other than that in which they arrive. This increases communication flexibility.

In the proposed star coupler, the time slots need not be globally defined. An embodiment in which different time slot sequences are defined for different connections is also conceivable. However, the cycle time which is divided into different time slots is then preferably the same. The use of different time slots may be useful if different control devices with possibly different basic settings are intended to be used in different bus branches. Complicated adaptation is then avoided. Assignment may nevertheless be possible. For example, the cycle time for a first connection may be divided into four time slots and the cycle time for a second connection may be divided into six time slots. The first time slots for the two connections then begin at the same time and the third time slot for the connection with the four time slots and the fourth time slot for the connection with the six time slots begin at the same time. Signals which were received in shorter time slots can be forwarded in the longer time slots, in particular.

The star coupler is preferably used in a bus system if at least three bus branches are connected to said coupler (at different connections). With three bus branches, communication can be globally effected, that is to say a signal which arrives via a first bus branch can be forwarded to the two other bus branches. It is possible to form a subgroup from two bus branches, in which the signals from one of the two bus branches is transmitted to the second of the two bus branches but the third bus branch is excluded from communication. With four bus branches, even two subnetworks can be defined.

The data processing unit of the star coupler can thus be designed to forward a signal arriving at a connection from a bus branch to only some of the other bus branches, at least in a predetermined time slot. If the signal reception duration overlaps when four bus branches are used, which is the case, in particular, if a time slot sequence is globally defined and signals from two different bus branches are received in the same time slot, a signal arriving from a first bus branch can be forwarded to a first further bus branch and a signal arriving from a second bus branch can be forwarded to a second further bus branch.

The inventor also proposes a method for interchanging signals in a bus system, in which a plurality of bus branches are coupled via a star coupler, with a sequence of time slots being defined for each bus branch, a signal is emitted in at least one first bus branch (of a control device connected there as a bus user) in at least one time slot defined for this first bus branch, and the star coupler forwards the signal to at least one further bus branch stipulated on the basis of the first bus branch and the time slot in which the signal was emitted.

The important factor is that, when stipulating the further bus branch, the star coupler is dependent on the bus branch via which the signal arrives and on the time slot in which it arrives. Such a star coupler must have the signals present in digital form and must have a data processing unit via which the further bus branch is stipulated.

It is possible, in particular, for temporally overlapping signals to be emitted in two bus branches, to be received by the star coupler and to be forwarded to different further bus branches. This is preferably effected when the time slots are globally defined or are defined in a partially global manner: the same sequence of time slots is defined for at least one subset of bus branches. In a first of these time slots, a signal is emitted in at least two bus branches of the subset and the two signals are forwarded to different bus branches (in particular of the subset).

This division of the bus system into two subsystems is preferably carried out only in the first of the time slots, while, in a second of the time slots, a signal is emitted in only one bus branch of the subset and is forwarded to all further bus branches (in particular of the subset), but preferably even to all bus branches. During the second of the time slots, the entire bus system can then be considered to be a unitary bus system and clock synchronization can take place, in particular.

The star coupler can decode messages in order to be able to decide whether or not to use them for clock synchronization. For this purpose, it must also consider the time at which the messages arrive.

The star coupler is preferably produced in analog and digital semiconductor processes, preferably in a mixed process in one die or with two dies in one housing.

At least three states are preferably defined in the bus system: IDLE, 0 and 1. There are two lines, bus plus (BP) and bus minus (BM), for this purpose. The voltages are as follows, for example:

BP=BM=2.5 V=IDLE(when no-one transmits)
BP−(150 to 1000 mV)=BM+(150 to 1000 mV)="1"
BP+(150 to 1000 mV)=BM−(150 to 1000 mV)="0".

The star coupler has, in particular, a clock input (crystal) since the digital logic requires a clock pulse.

The star coupler operates predefined routing according to a predefined switch matrix. The star coupler can be configured every time the voltage is applied. For this purpose, the switch matrix is then stored in an internal RAM. Alternatively, the configuration is in an internal flash memory. This configuration should be able to be changed if new control devices are added, for example during vehicle maintenance.

BRIEF DESCRIPTION OF THE DRAWINGS

These and other objects and advantages of the present invention will become more apparent and more readily appre- FIG. 1 schematically illustrates a star coupler proposed by the inventor.

DETAILED DESCRIPTION OF THE PREFERRED EMBODIMENT

Figure 1:
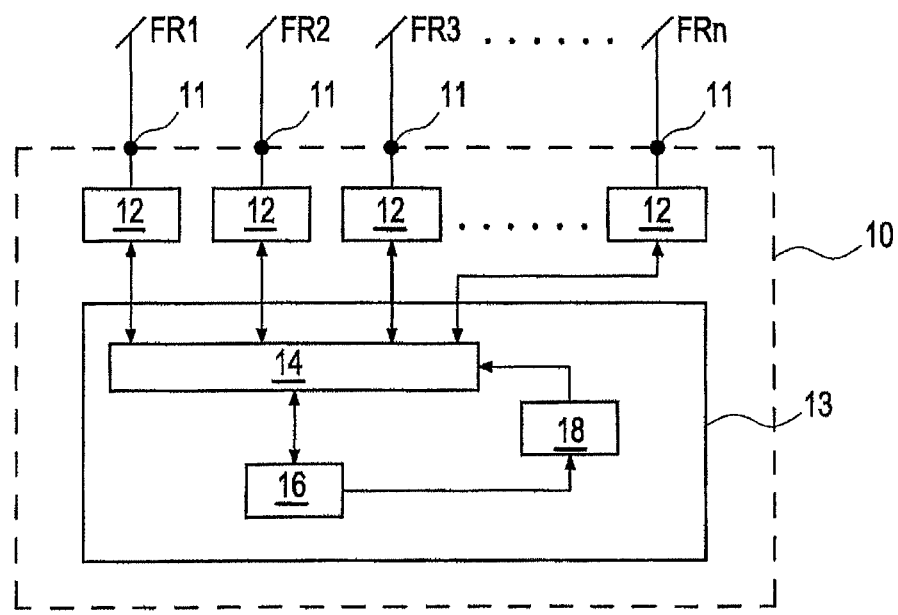

Reference will now be made in detail to the preferred embodiments of the present invention, examples of which are illustrated in the accompanying drawings, wherein like reference numerals refer to like elements throughout.

A star coupler denoted 10 as a whole has a plurality of connections 11. FlexRay buses FR1, FR2, FR3, ..., FRn, in particular, can be connected to the connections. From the point of view of the entire bus system, these are individual bus branches. Each connection 11 is coupled to a transceiver 12 (which can also be referred to as a bus driver). The transceiver converts analog signals arriving via the connection 11 into digital signals and forwards them to a data processing device 13; the transceiver 12 also receives digital data from the data processing device 13 and converts them into analog signals for the connection 11.

The digital data processing device 13 may be in the form of an FPGA ("Field Programmable Gate Array") or else in the form of a microcontroller or a digital signal processor. Functional subunits of the data processing unit 13 are shown and are denoted 14, 16 and 18. An assignment unit 14 receives signals from the connections 11 and thus the associated bus branches FR1 to FRn and conversely also transmits signals to the latter. The assignment unit is coupled to a timer ("clock") 16. The data processing unit 13 also comprises a bus guardian unit 18. The bus guardian unit 18 can use the time signal as a basis for assessing whether or not signals arriving from the connections 11 are permissible. This is because, in the entire bus system, the time slot in which signals are allowed to be transmitted is allocated in the bus branch FR1, FR2, FR3 to FRn. From the point of view of the star coupler 10, it is irrelevant which bus user transmits in the respective bus branch FR1 to FRn. All signals which are permissibly emitted and received by the star coupler 10 are forwarded by the allocation unit, to be precise according to a predetermined assignment. The allocation unit 14 assigns the signals on the basis of the time slot in which they arrive. The signals can be forwarded to all other connections of the connections 11 via which the signals were not received. The signals can also be forwarded only to some of the connections 11. It is possible, in particular, for signals to be received from two of the connections 11 in the same time slot, in which case these signals are forwarded to different connections of the further connections.

Figure 2:
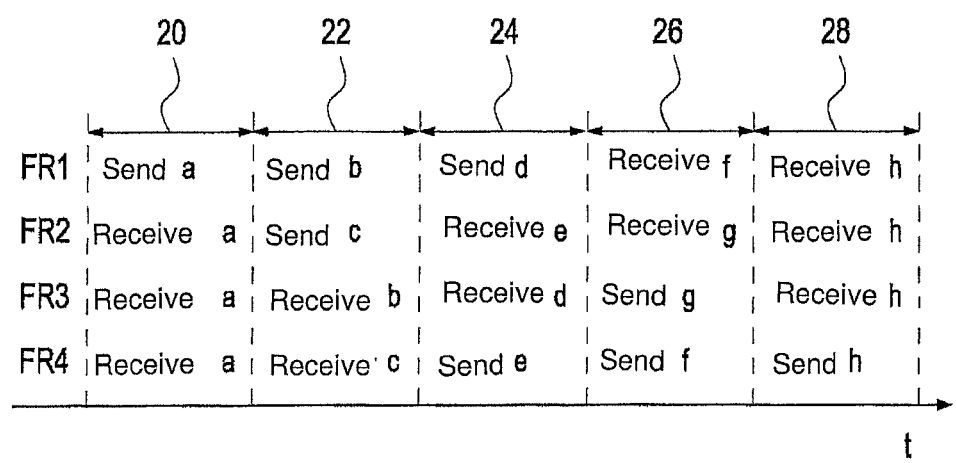
FIG. 2 illustrates an assignment of transmitted and received messages, which is possible by the proposed star coupler.

This is explained in FIG. 2. FIG. 2 shows a temporal sequence for four FlexRay branches FR1 to FR4 with the timeline as the abscissa indicating which messages (signals) are received and transmitted.

In a first time slot 20, the message a is transmitted in the bus branch FR1. The star coupler 10 forwards this message to all other bus branches, that is to say the message is received by the bus branches FR2, FR3 and FR4. In the time slot 20, the star coupler 10 operates like a conventional active star coupler.

In the time slot 22, a message is now transmitted in two bus branches, namely FR1 and FR2, to be precise the message b in FR1 and the message c in FR2. The star coupler 10 forwards the message b from FR1 to FR3 where it is received. The star coupler 10 forwards the message c from FR2 to FR4 where it is received. The star coupler 10 thus divides the bus system into two subsystems for the duration of time slot 22, namely into the subsystem formed from FR1 and FR3 and the subsystem formed from FR2 and FR4. This division also applies during the time slot 24. In this case, the message d is transmitted in FR1 and is forwarded to FR3. The message e is transmitted in FR4 and is forwarded to FR2.

In the time slot 26, two subsystems are likewise defined but they are different subsystems from those in the time slots 22 and 24: the message f is transmitted in FR4 and is forwarded by the star coupler 10 to FR1 and received there. The message g is transmitted in FR3 and is forwarded by the star coupler 10 to FR2 and received. There is thus virtually a subsystem formed from FR1 and FR4 and a subsystem formed from FR2 and FR3 for the duration of the time slot 26.

In the time slot 28, the star coupler 10 then operates like a conventional star coupler again: a message, namely the message h, is transmitted only in one bus branch, in FR4 in the present case, and is forwarded to all other bus branches FR1, FR2, FR3 and received there.

The star coupler 10 uses the available bandwidth of a FlexRay system in a particularly efficient manner. This system is treated as a complete system in the time slots 20 and 28 and is broken up into subsystems in the time slots 22 and 24 and 26, albeit only virtually. There is no need for any gateways. There is no need for separate clock synchronization to respectively take place in individual subsystems since this can be effected in the time slots 20 and 28. No changes whatsoever to the protocol are therefore necessary. The function of a bus guardian 18 is simultaneously provided in the star coupler 10.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A star coupler for a bus system, comprising:
   a plurality of connections to which bus branches can be connected;
   a digital data processing unit coupled to the connections; and
   a plurality of transceivers, each transceiver being provided between a respective associated connection and the data processing unit, each transceiver converting analog signals arriving via the respective associated connection into digital signals which are forwarded to the data processing unit and converting digital signals emitted by the data processing unit into analog signals which are forwarded to the respective associated connection,
   wherein the data processing unit comprises a timer to divide a cycle time such that for each connection, a cyclically repeating sequence of time slots is defined, the data processing unit operating according to a predetermined assignment relating to time slots such that a signal received from a first connection in a predetermined time slot defined for the first connection, is forwarded to at least one second connection stipulated according to the predetermined assignment, the signal being forwarded in a time slot stipulated by the predetermined assignment and defined for the second connection, wherein the predetermined assignment stipulates that signals are forwarded in a time slot other than that in which they arrive.

2. The star coupler according to claim 1, wherein the assignment for signals arriving via the first connection is different for two different time slots defined for the connection.

3. The star coupler according to claim 2, wherein first and second time slots are assigned to the first connection,
   a signal arriving in the first time slot is forwarded to the second connection, and
   a signal arriving in the second time slot is not forwarded to the second connection.

4. The star coupler according to claim 1, wherein the timer defines an identical cyclically repeating sequence of time slots for each connection.

5. The star coupler according to claim 4, wherein in the first time slot signals are received via at least first and third connections,
   the signal arriving from the first connection is forwarded to the second connection, and
   the signal arriving from the third connection is forwarded to a fourth connection.

6. The star coupler according to claim 1, wherein the cycle time is divided into time slots of different length for at least two different connections.

7. The star coupler according to claim 1, wherein the signals are present in the form of messages, and the messages are decoded by the star coupler.

8. The star coupler according to claim 1, wherein an application specific integrated circuit is used to form at least part of the star coupler.

9. The star coupler according to claim 1, wherein the star coupler has an input to receive a clock pulse.

10. The star coupler according to claim 1, wherein a time slot switch matrix defines the predetermined assignment, and
    the star coupler further comprises a memory to store the switch matrix.

11. The star coupler according to claim 10, wherein the memory if an internal RAM memory or an internal flash memory.

12. A bus system comprising:
    at least three bus branches; and
    a star coupler comprising:
        at least three connections connected respectively to the at least three bus branches;
        a digital data processing unit coupled to the connections; and
        a plurality of transceivers, each transceiver being provided between a respective associated connection and the data processing unit, each transceiver converting analog signals arriving via the respective associated connection into digital signals which are forwarded to the data processing unit and converting digital signals emitted by the data processing unit into analog signals which are forwarded to the respective associated connection,
        wherein the data processing unit comprises a timer to divide a cycle time such that for each connection, a cyclically repeating sequence of time slots is defined,
        the data processing unit operating according to a predetermined assignment relating to time slots such that a signal received from a first connection in a predetermined time slot defined for the first connection, is forwarded to at least one second connection stipulated according to the predetermined assignment, the signal being forwarded in a time slot stipulated by the predetermined assignment and defined for the second connection,
        wherein the predetermined assignment stipulates that signals are forwarded in a time slot other than that in which they arrive.

13. The bus system according to claim 12, wherein the signal arriving from the first connection is not forwarded to all other bus branches.

14. The bus system according to claim 12, wherein signals are carried on the bus branches using a bus voltage between 1 V and 4 V.

15. A method for interchanging signals in a bus system, comprising:
    coupling a plurality of bus branches to a star coupler;
    defining a sequence of time slots for each bus branch; and
    establishing a predetermined assignment relating to time slots such that a signal received at the star coupler from a first bus branch in a time slot defined for the first bus branch, is forwarded to at least one second bus branch stipulated on the basis of the first bus branch and the time slot in which the signal was received,
    wherein the predetermined assignment stipulates that signals are forwarded in a time slot other than that in which they arrive.

16. The method according to claim 15, wherein at least first, second, third and fourth bus branches are connected to the star coupler, and the method further comprises:
    receiving temporally overlapping signals from the first and third bus branches;
    forwarding the signal received from the first bus branch to the second bus branch; and
    forwarding the signal received from the third bus branch to the fourth bus branch.

17. The method according to claim 16, wherein a cycle time is divided such that for each bus branch, a cyclically repeating sequence of time slots is defined,
    an identical cyclically repeating sequence of time slots is defined for at least the first and third bus branches such that the time slots associated with the first bus branch have a length equal to the time slots associated with the third bus branch, and
    the temporally overlapping signals were received from the first and third bus branches in a first time slot.

18. The method according to claim 17, wherein a signal received in a second time slot is forwarded to all other bus branches.

19. The method according to claim 15, wherein the first bus branch forms a subnetwork with the second bus branch for the duration of the time slot, and a third bus branch forms a subnetwork with a fourth bus branch for the duration of the time slot.

* * * * *

UNITED STATES PATENT AND TRADEMARK OFFICE
CERTIFICATE OF CORRECTION

PATENT NO. : 8,918,570 B2  
APPLICATION NO. : 13/380296  
DATED : December 23, 2014  
INVENTOR(S) : Paul Milbredt Page 1 of 1

It is certified that error appears in the above-identified patent and that said Letters Patent is hereby corrected as shown below:

On the Title Page

Column 1, Item [73] (Assignee), Line 3, delete "Galmershelm (DE)" and insert -- Gaimersheim (DE) --, therefor.

In the Claims

Column 7, Line 40, in Claim 11, delete "if" and insert -- is --, therefor.

Signed and Sealed this  
Thirtieth Day of June, 2015

Michelle K. Lee  
*Director of the United States Patent and Trademark Office*